June 22, 1943.　　　R. H. GABEL　　　2,322,290
APPARATUS FOR MAKING TUBULAR ELECTRODES
Filed May 13, 1940　　　7 Sheets-Sheet 1

INVENTOR.
Richard H. Gabel
BY Cornelius D. Ehret
ATTORNEY.

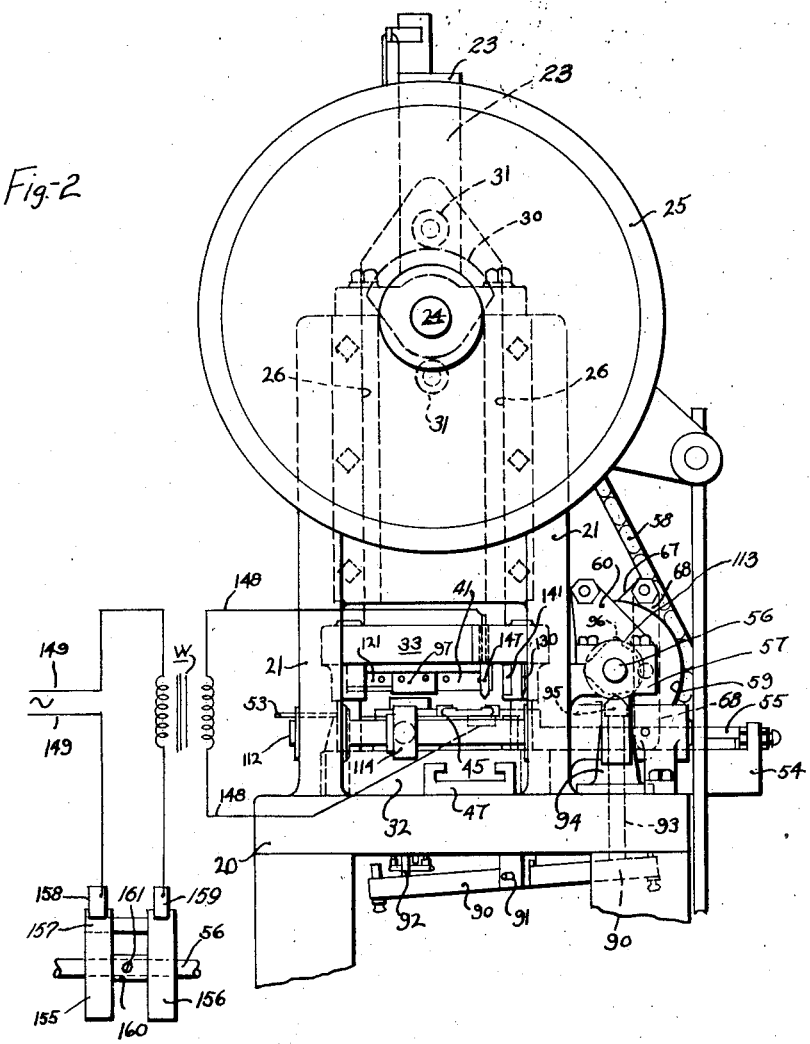

June 22, 1943.        R. H. GABEL        2,322,290
APPARATUS FOR MAKING TUBULAR ELECTRODES
Filed May 13, 1940          7 Sheets-Sheet 3
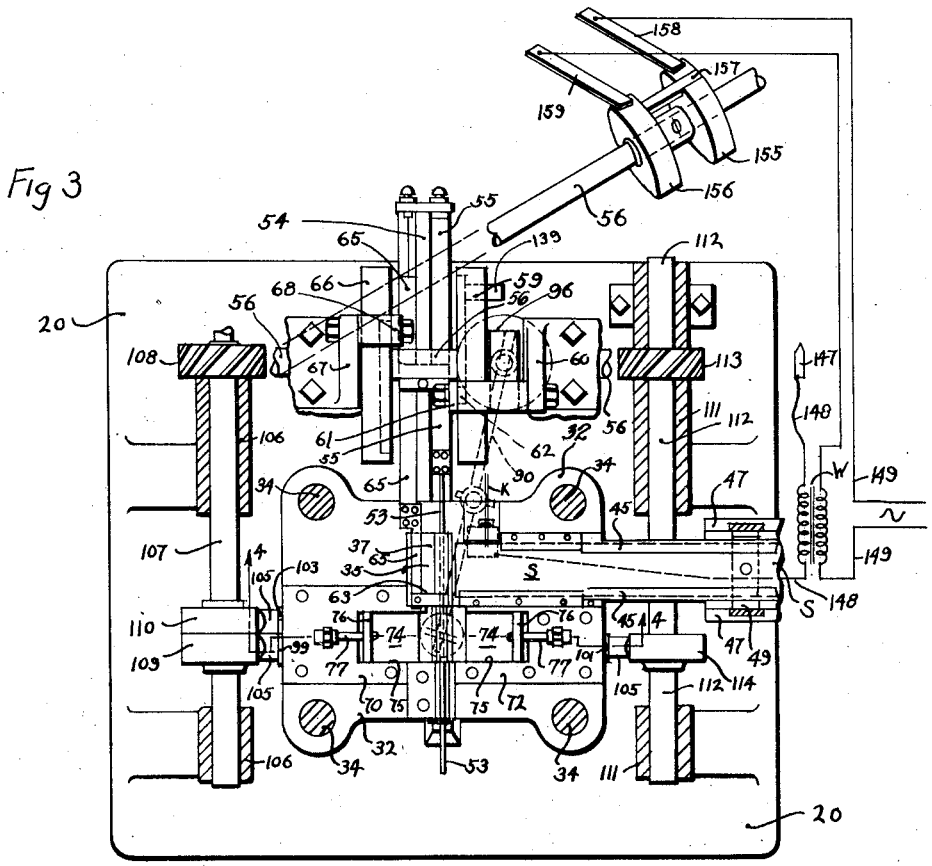
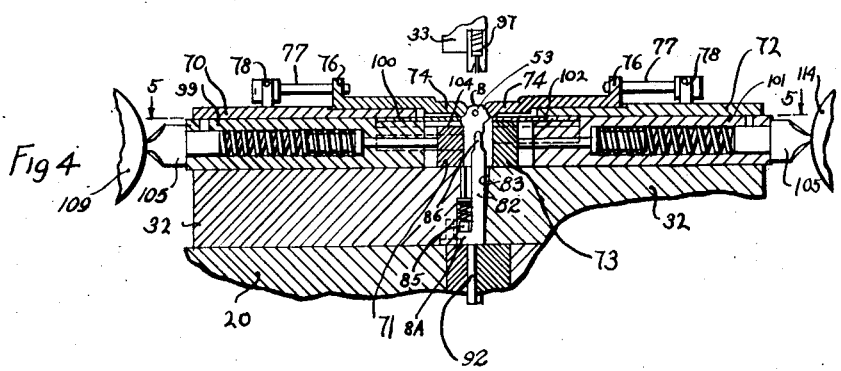
INVENTOR.
Richard H. Gabel
BY Cornelius D. Ehret
ATTORNEY.

June 22, 1943.   R. H. GABEL   2,322,290
APPARATUS FOR MAKING TUBULAR ELECTRODES
Filed May 13, 1940   7 Sheets-Sheet 4

INVENTOR.
Richard H. Gabel
BY
Cornelius D. Ehret
ATTORNEY.

June 22, 1943.  R. H. GABEL  2,322,290
APPARATUS FOR MAKING TUBULAR ELECTRODES
Filed May 13, 1940  7 Sheets-Sheet 5
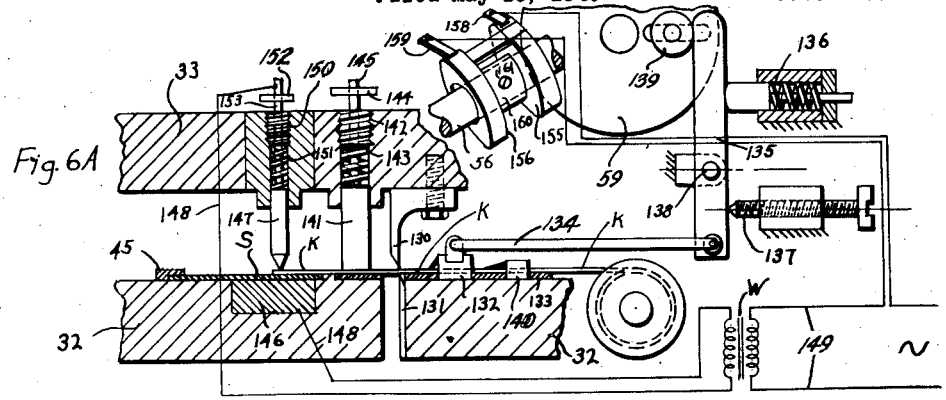
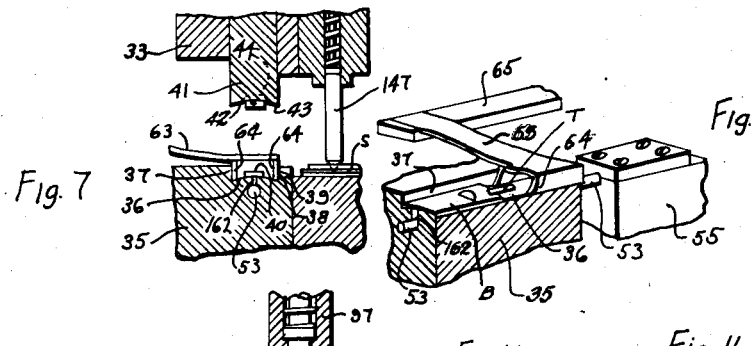
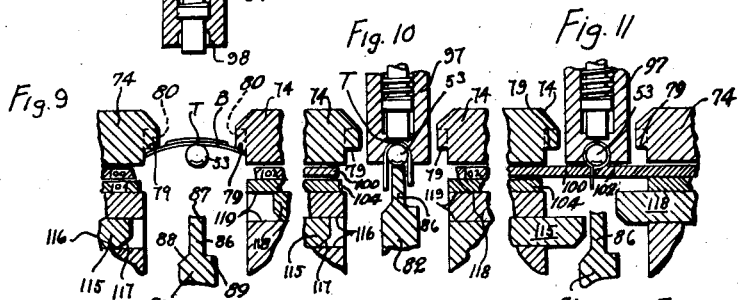
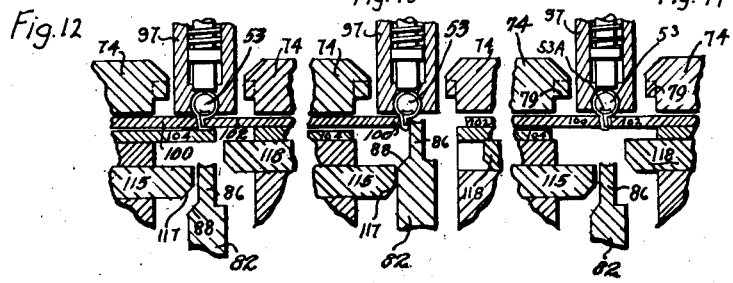
INVENTOR.
Richard H. Gabel
BY Cornelius D. Ehret
ATTORNEY.

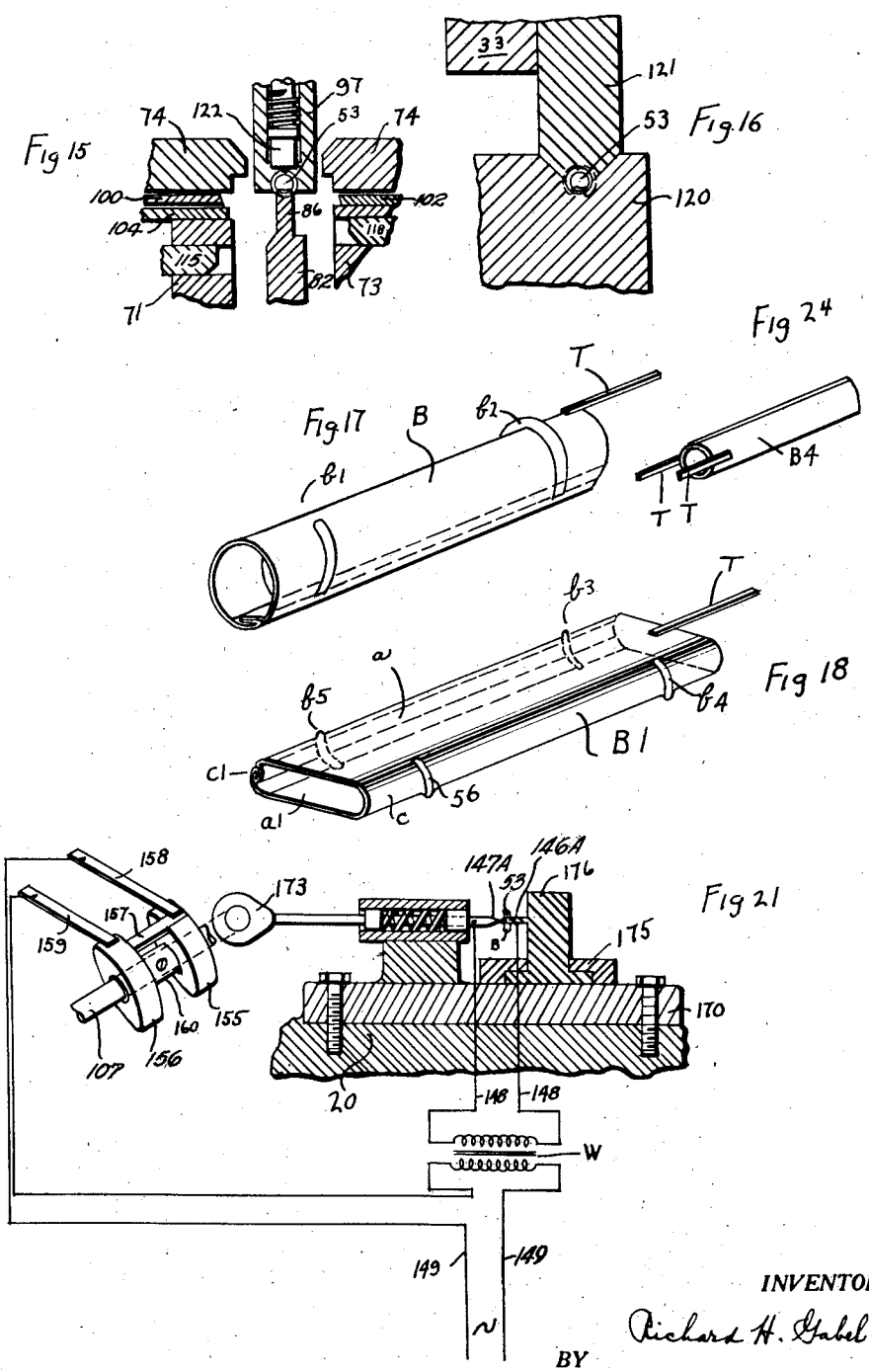

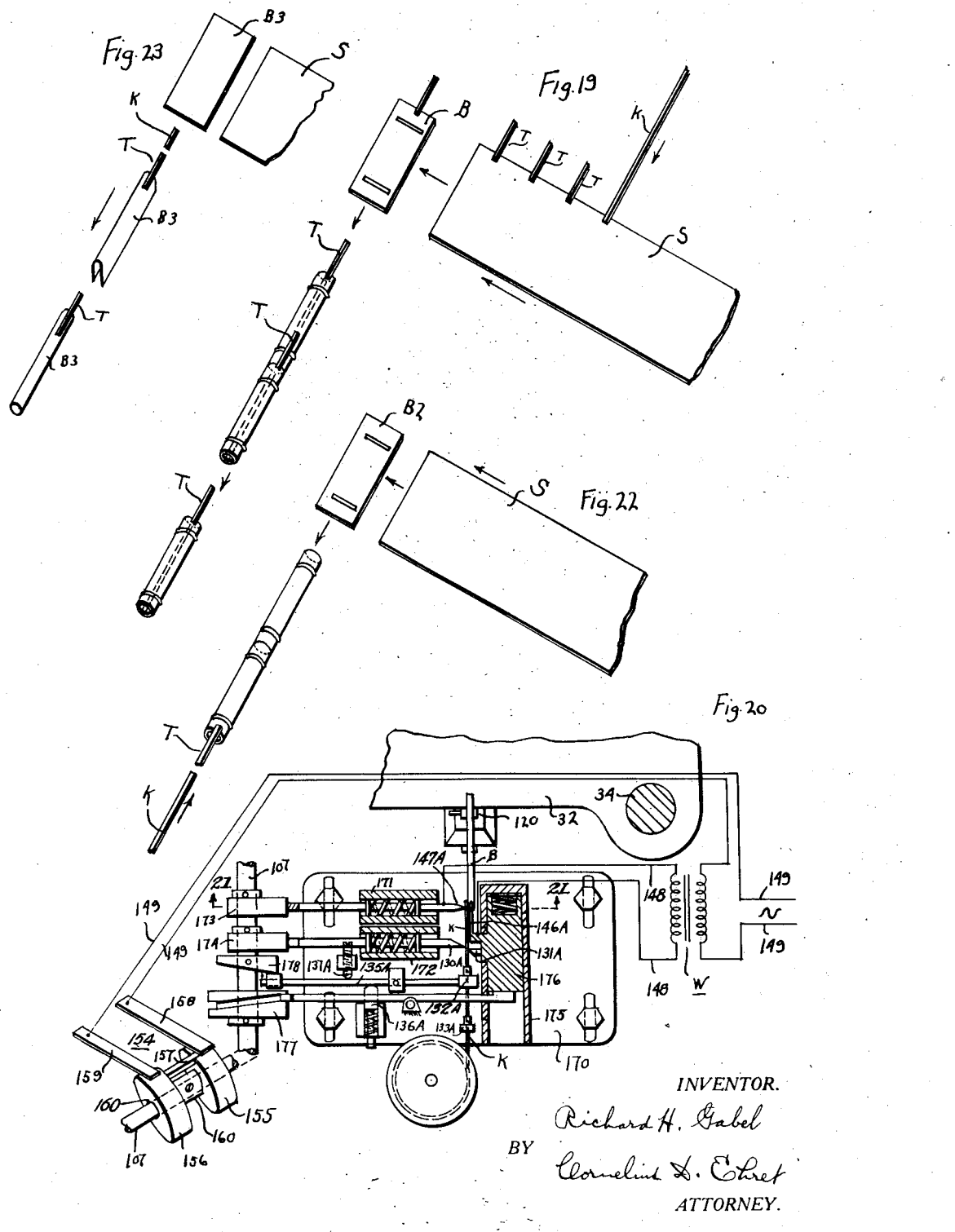

Patented June 22, 1943

2,322,290

UNITED STATES PATENT OFFICE 2,322,290

APPARATUS FOR MAKING TUBULAR ELECTRODES

Richard H. Gabel, Norristown, Pa., assignor to Superior Tube Company, Philadelphia, Pa., a corporation of Pennsylvania Application May 13, 1940, Serial No. 334,751

7 Claims. (Cl. 219—4)

My invention relates to apparatus for manufacturing tubular electrodes, for example cathodes, for thermionic tubes, having attached thereto elements, including tabs, for positioning or supporting the electrodes in the tubes and/or for electrically connecting the electrodes in circuit.

In accordance with my invention, the elements or tabs are attached to the electrodes, as by welding or equivalent, at suitable stage or stages in the production of tubular electrodes from blanks cut from a sheet metal strip of stock and in suitable further steps each shaped, as about a mandrel, and at its margins or edges joined to form a seam or joint; more particularly, the elements or tabs may be attached before shaping of the electrode blanks or before or aften completion of the tubes in final or substantially final electrode form; preferably they are attached before, concurrently with or after cutting of blanks from the strip, or alternatively, the elements or tabs may be attached or applied to the approximately completed or completed electrode tubes before their removal from the mandrel.

Further in accord with my invention two or more elements or tabs simultaneously may be attached in any of aforesaid stages, or in succession in different stages.

Further in accordance with my invention, the leading end or portion of a strip of the stock from which the elements or tabs are formed, is attached by welding, or equivalent, to the strip from which the electrode blanks are cut, to the electrode blanks in any stage of operations thereon, or to the completed electrode tubes; and after aforesaid attachment of the strip of tab or element stock in any of aforesaid stages, it is severed at desired distance from its attachment to constitute and define a completed attached tab or element.

My invention resides in apparatus having the features hereinafter described and claimed.

For an understanding of my invention, reference is had, for illustration of some of the various characters and forms it may have and take, to the accompanying drawings, in which:

Fig. 2 is a side elevational view of parts shown in Fig. 1;

Fig. 3 is a sectional view, in plan, taken on line 3—3 of Fig. 1;

Fig. 4 is a front elevational view, in section, taken on line 4—4 of Fig. 3;

Fig. 6A is an end elevational view, partly in section, of tab-applying, tab-feeding and tab-severing mechanism;

Fig. 7 is a sectional view, in front elevation, taken on line 7—7 of Fig. 5;

Fig. 8 shows the elements of Fig. 7 in perspective;

Figs. 9 to 16, inclusive, are cross-sectional views illustrating the operations of the various tools of preceding figures for forming tabbed tubular electrodes from blanks;

Fig. 17 is a perspective view, on greatly enlarged scale, of the tabbed electrode produced by the machine of Figs. 1 to 16;

Fig. 18 illustrates a modification of the elecctrode shown in Fig. 17;

Fig. 19, in perspective, illustrates successive steps of a method of producing tabbed tubular electrodes;

Fig. 20 is a sectional view, in plan, of a modification of the machine of Figs. 1 to 16 suited to perform another method of producing tabbed tubular electrodes;

Fig. 21 is a front elevational view, in section, taken on line 20—20 of Fig. 20;

Fig. 22, in perspective, illustrates successive steps of a method of producing tabbed tubular electrodes;

Fig. 23, in perspective, illustrates another method of forming tabbed tubular electrodes;

Fig. 24, in perspective, illustrates an electrode having a plurality of tabs attached in accordance with any of the preceding methods.

Figure 1:
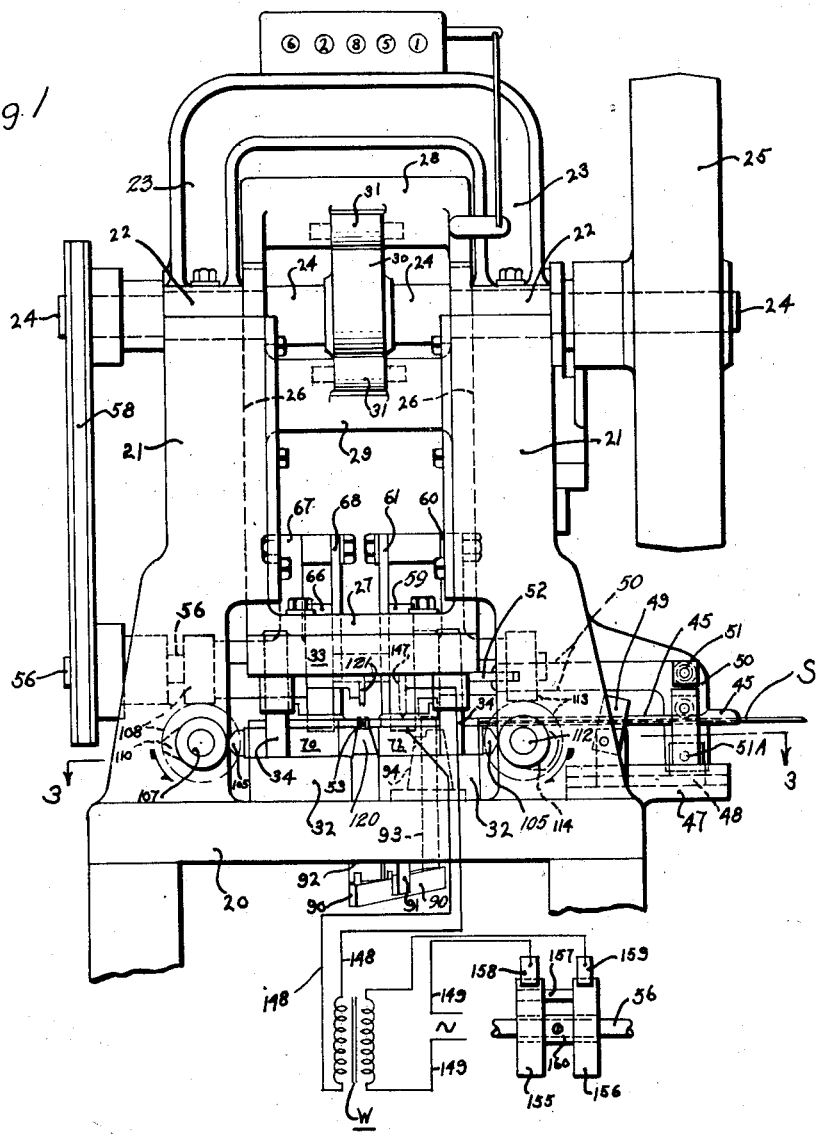
Fig. 1 is a front elevational view of a machine for making tabbed tubular electrodes and includes, diagrammatically, a welding circuit.

Referring particularly to Figs. 1 and 2 of the drawings, the stamp member 27 is vertically reciprocable in the guideways 26 of the main frame 21 supported upon base 20 of the machine and provided with a frame head 23. The drive shaft 24 for the stamp member 27 is journalled in bearings 22 held in position by the frame members 21 and 21. To the shaft 24, driven as by pulley 25 from any suitable source, is attached cam 30 continuously in engagement with the anti-friction rollers 31 carried by the cross-heads 28 and 29 of the stamp member 27. The cam 30 is so shaped, Fig. 2, that for each revolution of shaft 24 the stamp member 27 moves from and returns to the upper limit of its stroke and dwells for a substantial portion of the cycle at the lower limit of its stroke.

The bottom die block 32, attached to the base 20 of the machine, is provided with guide pins 34 which extend through corresponding openings in the upper die block or tool support 33 attached to the under face of the stamp member 27 so to maintain, during relative movement of the die blocks, the proper relative positions of various tools which, as hereinafter described, operate to form tubular tabbed electrodes from strips of electrode and tab material.

Referring more particularly to Figs. 3, 5, 6 and 7, the stationary die member 35, suitably secured to the bottom die block 32, comprises a transversely convex die portion 36 bounded along one edge by a vertical wall or stop 37 and on the opposite edge by a vertical wall serving as a shearing member having an outwardly and downwardly extending chamfer 39. The convex face 36 of die member 35 may be provided with one or more projections 40 for beading an electrode blank concurrently with its severance from strip S of electrode material. As hereinafter appears, the beading may be omitted, or may be effected in some other stage, in advance of or following the blanking stage.

The movable die member 41 for coacting with the stationary die member 35 is attached to the upper die block 33 for reciprocation therewith. The bottom face 42 of die member 41 is concave to fit the convex surface 36 of the stationary die member 35. The edge 43 of die member 41 coacts with aforesaid shearing edge 38 of the stationary die member 35 in cutting a series of electrode blanks from strip S. When the blank is to be beaded, the die face 42 is suitably recessed at 44 to coact with the beaded projections 40 of the stationary die member 35.

The strip S of sheet metal stock from which the electrode blanks are cut is of width corresponding with the length of electrode to be produced and is intermittently fed from a roll, or other suitable source of supply, to bring the leading edge of the strip against the stop 37. Thereafter, in the cycle of the machine the stamp member 27 descends and the shearing members 43, 38, sever the strip transversely to detach an electrode blank B from the strip S. During continued downward movement of the stamp 27, the blank is beaded and slightly bent, as indicated most clearly in Fig. 8.

Any suitable arrangement for intermittently feeding the strip S may be utilized; in the particular arrangement shown, the edges of strip S are received by the guideway 45 and the upper face of the strip is engaged by a gripper 49 pivotally mounted upon carriage 48 slidable in the stationary guide member 47 toward and from aforesaid die member 35. During movement of the carriage 48 toward the die, the gripper 49 is effective to move the strip S forwardly, whereas, for reverse movement of the slide, the feeding dog or gripper member 49 slides over the strip without effecting reverse movement thereof.

The reciprocation of the carriage 48 is effected by bell crank 50 pivoted at 51 to the frame 21 of the machine and at 51A to the carriage 48. The tongue 52, Fig. 1, affixed to the upper die block 33 is received by the forked end of one of the arms of bell crank lever 50 so that upon each upward stroke of the stamp member 27 the carriage 48 moves toward the die 35 to feed strip S between the die members 35 and 41. During each down stroke of the stamp member 27, the bell crank lever 50 is rotated by tongue 52 in reverse or counterclockwise direction to move carriage 48 to the right, in anticipation of its next strip-feeding movement.

Before the leading portion or end of strip S is severed by the shearing members 43, 38, there is attached to it a tab T cut from the strip K of flat stock or flattened wire, Figs. 2, 3, 5 and 6A, by the movable shearing member 130, attached to the upper die block 33, in alignment with the stationary shearing member 31 attached to the lower die block 32. The strip K is intermittently advanced over the strip S of electrode stock in timed relation to the feeding movements thereof by any suitable mechanism. For example, as shown in Fig. 6A, the feeding pawl or dog 132, slidably received by the guide plate 133, is pivotally connected to one end of the link 134 whose other end is pivotally connected to the actuating arm 135, biased as by spring 136 against an adjustable stop 137. The arm 135 is rocked about its pivot 138 by a cam, or, as indicated by an abutment 139, attached to rotatable member 59 and preferably adjustable to different distances from the axis of rotation thereof to permit selection of a desired length of tab to be cut from strip K. The stationary dog 140 prevents reverse movement of the strip K during the return or non-feeding stroke of dog 132.

Upon descent of the primary stamp member 27, the leading end of tab strip K, which as been fed over the strip S of electrode stock, is engaged by the resiliently mounted clamping member 141 extending downwardly from the upper die block 33, and extending suitably beyond the lower edge of the movable shearing member 130 to insure clamping of the leading end of strip K before it is severed by knife 130. The clamping pressure may be varied by adjustment of the threaded plug 142 between which and the member 141 a spring 143 is compressed. The stop 144, attached to the guide rod 145 of member 141, retains the clamping member 141 in the die block 33 during reciprocation thereof.

In the particular arrangement shown in Fig. 6A, the strips S and K are engaged, respectively, by the welding electrodes 146, 147, at least one of which must be suitably insulated from the frame of the machine. The electrodes are connected by conductors 148 to a suitable source of welding current, for example, to the secondary winding of a welding transformer W, usually a step-down transformer whose primary winding is connected by conductors 149 to any suitable source such as a 110-volt, 60-cycle power line. The electrode 147 is resiliently mounted in the die block 33 and the pressure with which it clamps the tabbed strip K against the electrode strip S may be varied by adjustment of the threaded plug 150 between which and the electrode 147 the spring 151 is compressed. The stop 152 attached to the guide rod 153 of electrode 147 limits its downward movement relative to the die block 33 as the latter is lifted.

Less desirably, and when the cross-sectional area of tab K permits, the member 147 need not be an electrode and may be utilized merely to effect engagement or contact of the two strips S and K connected to terminals of the source of welding current, and brought into contact with each other by member 147 during descent of the stamp member 27.

In either case, it is usually desirable the period during which welding current flows through the contact between the strips to effect their attachment be materially less than the duration of clamping engagement of the members or electrodes 146, 147 and should not begin to flow until after contact of or engagement between the strips is effected. Any suitable known arrangement to procure the desired duration of flow of welding current may be utilized; in the particular arrangement shown, a circuit interrupter 154 is provided in the primary circuit of the welding transformer W. The interrupter illustrated as exemplary comprises discs 155, 156 rotating in unison with shaft 56, for example, of the machine. The disc 155 of insulating material is provided with a contact bar or segment 157 for engaging a brush 158 and is connected, as by a continuation of that segment, to a slip ring comprising disc 156 in continuous engagement with brush 159 and preferably insulated from the shaft 56 as by the hub 160 of insulating material to which both discs 155 and 156 may be attached. The assembly, comprising hub 160 and the attached discs 155, 156, may be angularly adjustable with respect to shaft 56; in the arrangement shown, provision for such adjustment is afforded by the clamping screw 161.

The duration of the flow of welding current utilized to attach a tab to the strip S may be varied by suitably changing the angular extent of the commutator segment 157 or in any other suitable manner, for example, by use of so-called "electronic timers" utilizing thyratron tubes and devices for controlling the phase and/or magnitude of the grid voltages of the thyratrons.

In any event, by whatever particular arrangement utilized, my method contemplates, as exemplified in Fig. 19, the attachment of the strips S and K to each other, as by welding, and severance of the tab T from its strip K substantially concurrently with its attachment to the strip S and before severance of the leading end of strip S to detach therefrom an electrode blank B. The tabbed blank B, Fig. 19, is thereafter, as hereinafter described, shaped, for example about mandrel 53 of the machine shown in Figs. 1 to 16, to form a tubular electrode having attached to it a tab T subsequently utilized to mount the electrode in a thermionic tube and/or to provide for its connection in circuit as an element of the tube.

The mandrel 53, Figs. 1 to 16, about which the blanks B are shaped slidably extends through the stationary die member 35 with its upper face slightly below the face 36 thereof. To the rear of the die member 35, the mandrel 53 is attached to the reciprocable member 55 received by the guideway 54. The lever 61 pivotally connected at its lower end to the slidable member 55 and at its upper end to the stationary bracket 60 is provided with a cam follower or roller 62 received by the groove of a cam 59 attached to shaft 56 which rotates in timed relation to the reciprocations of the stamp member 27. In the particular arrangement shown, the shaft 56 is driven from the main drive shaft 24 by chain 58 which engages sprockets attached to the respective shafts. The reciprocation of the mandrel, as hereinafter explained, advances electrode tubes formed on the mandrel to finishing dies and ultimately effects their discharge from the machine.

The mechanism for moving the tabbed blank B from the die 35, Fig. 8, into position directly over mandrel 53 comprises reciprocable blank-feeding member 63, Figs. 7 and 8, having depending fingers 64 serving, upon forward movement of member 63, to push the blank to the left, Fig. 8, sufficiently to clear the die 35 and to position the blank B below the bending die 97. To effect its reciprocation, the feeding member 63 is attached to the slide 65 reciprocable in the guideway 54 and pivotally attached to the lower end of the oscillatable lever 68 pivoted at its upper end to the bracket 67 and provided intermediate its ends with a cam follower or roller received by the groove of cam 66 attached to shaft 56 which, as previously stated, makes one revolution for each cycle of the primary stamp member 27.

Figure 6:
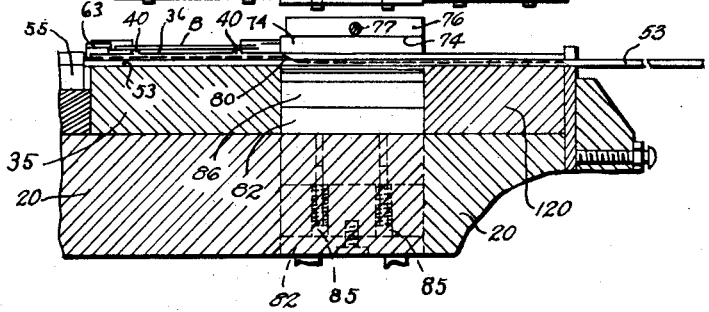
Fig. 6 is an elevational view, in section, taken on line 6—6 of Fig. 5.

As the blank is pushed from the die member 35 to the right, Fig. 6, it is downwardly deflected by the inclined surfaces 80 of the guiding members 74, Fig. 4, adjustable toward and from each other on opposite sides of the mandrel by the adjusting screws 77 each of which threadably engages the upstanding portion 76 of a guide member 74 and is received by a bearing 78 attached to one or the other of the housings 70, 72 upon which the guides 74 are slidably mounted.

Figure 5:
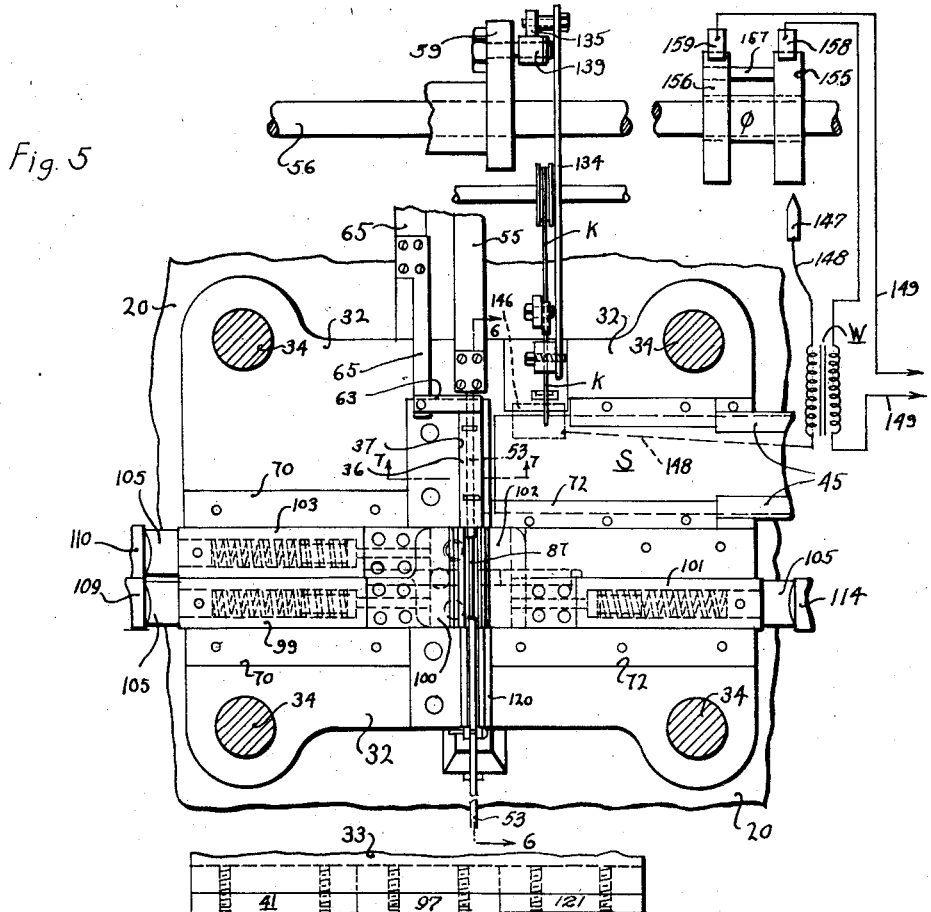
Fig. 5 is a sectional view, in plan, taken on line 5—5 of Fig. 4.

The block 99, Figs. 4 and 5, reciprocable within the housing 70, carries the tools 100 and 115 slidable through the stationary supporting block 71 attached to or forming a wall of the housing 70. The block 103, slidable within housing 70, carries the tool 104 slidable through aforesaid supporting block 71. The block 101, reciprocable within housing 72, carries the tool 102 slidable through the supporting block 73 attached to or forming a wall of the housing 72. The cams 109, 110 for effecting reciprocation of the blocks 99 and 103 are mounted upon shaft 107, Fig. 3, driven from shaft 56 through the gears 108, Fig. 1. The cam 114, Fig. 3, for effecting reciprocation of the slide block 101 is attached to shaft 112 driven from shaft 56 through the gears 113, Fig. 1. Preferably, the ends of the slide blocks 99, 101 and 103 are each provided with a hardened cam follower 105.

Referring to Fig. 9, the edges of the blank B upon its transfer from die 35 are engaged by vertical faces of the guide blocks 74, the under face of the blank is engaged by the mandrel 53, and the upper face of the blank is engaged near its edges by the under faces of the shoulders 79 of the guides 74. The blank is thus definitely positioned by the guides below the bending die 97 having in its lower face a substantially U-shaped recess or groove whose width corresponds with the diameter of the electrode to be formed. When the blanks are beaded, the groove 98 is suitably recessed to receive the beads.

Upon descent of the primary stamp member 27 to effect severance of a blank from the strip S, and to effect attachment of a tab to an unsevered portion of strip S, the die member 97 substantially concurrently bends a tabbed blank which has been transferred from the blanking die 35 into substantially U-shape, Fig. 10, with one leg of the U longer than the other because of offset adjustment of the guides 74, 74. Flexure of the mandrel 53 is prevented during this bending of the blank over it, Fig. 10, by the reciprocable support 82 which, as shown in Figs. 4 and 6, projects from a slot or groove 83 in the lower die block 32 and is provided with a shoulder 84 for engagement with spring-pressed plungers 85 which bias the support 82 toward engagement with the frame member 20 of the machine. The operating rod 92 for effecting reciprocation of the support 82 extends through the frame member 20 of the machine for engagement with one arm of a lever 90 pivoted at 91 to a bracket extending from the under face of frame 20 and whose other arm is engaged by a push rod 93, Fig. 1, slidably received by support 94, and whose head 95 is engaged by cam 96 on shaft 56.

Upon completion of such bending of the tabbed blank, a supporting member 82 is moved away from the mandrel under control of cam 96 by spring-pressed plungers 95, and the tools 101, 102 are moved toward each other, Fig. 11, further to bend the blank and to effect engagement of the edges or marginal areas of the blank so to provide a seam lengthwise thereof. During this shaping and seam-forming operation, the die 97 remains in its lowermost position embracing the mandrel to prevent flexure thereof.

While the tools 101, 102 remain in the position shown in Fig. 11, or upon slight movement of both of them to the right, the block 103 is moved to the right by cam 110 so that tool 104 bends the projecting end of the longer wing of the bent blank over the end or edge of the shorter wing. Thereupon the tool 102 is withdrawn, Fig. 13, under the control of cam 114, and the member 82 is again moved upwardly under the control of its cam 96. During this second upward movement of member 82, its sloping shoulder 88 coacts with the sloping shoulder 117 of the tool 115 to effect deflection of the member 82 to the right, Fig. 13, so that member 82 further bends the longer wing of the blank about the end of the shorter wing and thus locks the seam.

The die or supporting member 82 is then retracted and the slide block 101 again moved to the left, Fig. 14, whereupon the tools 101, 102 coact tightly to press together the edge portions or marginal areas of the blank.

While the die 97 still remains in its lowermost position, and after retraction of the tools 100 and 102, the die member 82 is again moved upwardly, Fig 15, to press the seam into the groove 53A extending longitudinally of the lower face of the mandrel 53 so that the external face of the seam is substantially flush with the adjoining areas of the shaped blank or tubular electrode. The bending die 97 is then raised and the die 82 is lowered in readiness for their next cycle of operations upon another blank.

During upward movement of the bending die 97 and before it again descends into engagement with another blank, the cam 59 which controls the longitudinal reciprocation of mandrel 53 operates first to retract the mandrel and then to return it to its original position. Because of engagement between the last-formed tubular electrode and the forward face of the die block 35, the mandrel slides with respect to the electrode during its retractive movement. When the mandrel subsequently is moved forwardly, the formed electrode, because of its frictional engagement with the mandrel, advances with it and is positioned thereby between the finishing dies 120 and 121 carried respectively by stationary die block 32 and movable die block 33. To avoid injury to the tab T attached to the electrode, the die block 35 (Figs. 7 and 8) is provided with a recess or groove 162 which receives the tab.

When the stamp member 27 again descends, the tubular electrode formed in the prior cycle of the machine is trued by the coaction of the finishing dies 120, 121. The faces of these dies 120, 121 are recessed when necessary to avoid injury to and/or to shape the bead or beads $b1$, $b2$ of the electrode. The movable finishing die 121 and the bending die 97 should be recessed to receive the tabs T of the blanks when applied at any prior stage; i. e., when the machine is utilized to perform the method exemplified in Fig. 19 or 23. Neither of them need be so recessed when the machine is utilized to perform the method exemplified in Fig. 22.

It is to be understood that, concurrently with operation of the finishing dies upon a shaped blank or electrode to true it, the bending die and the tools associated with the housings 70 and 72 substantially concurrently shape another blank to form a seamed electrode.

It is further to be understood, all as more fully explained in Haslauer Patent No. 2,116,971, that while the die blocks 32 and 33 are separated, a formed electrode is advanced to position between the finishing dies, another blank is positioned below the bending die 97 in forming of an electrode therefrom, and that the strip S with tab attached thereto is fed beneath the movable blanking die.

After several cycles of operation of the machine, there is therefore a series of tabbed electrode tubes on the mandrel with the result that each time the mandrel is retracted, engagement of the last-formed tube of the series with the forward end of the die block 35 causes all tubes of the series to advance with respect to the mandrel, the first formed tube of the series falling off the end of the retracted mandrel.

The finished tabbed electrode as discharged from the machine is shown in Fig. 17; for different types of thermionic tubes, the diameter of the cathode may vary widely, for example from about .040 inch to about .110 inch. Either or both of the beads $b1$, $b2$ may be omitted from the electrode by suitable modification of the coacting surfaces of the blanking dies. If desired, the forward bead $b1$ of each blank may be provided with a gap to pass the tab T of the preceding electrode or blank of the series upon the mandrel, Fig. 19.

When it is desired the electrodes be of the lockseam type, the method illustrated in Fig. 19 conveniently may be formed by the apparatus previously described and shown in Figs. 1 to 16. When the strip S is of width substantially corresponding with the length of the electrode, each tab T is attached to project beyond the leading or front edge, instead of one of the side edges as in Fig. 19, and the length of the blank cut from the strip corresponds with the circumference of the electrode. Other forms of apparatus may be used, or at least some of the operations may be performed manually. For example, the edges, or marginal areas of the bent blank, Figs. 10 and 11, may be joined by welding them, in which event tools 100 and 102, at least one suitably insulated from the machine, may be utilized as welding contacts. In such case the legs of the U, Fig. 10, may be of equal length and tool 104 omitted. The projecting seam formed by such welded attachment of the edges of the blank may be pressed, as by tool 82 or equivalent, into the groove 53A of the mandrel so to lie flush with adjoining areas of the electrode. With this type of seam, there are only three thicknesses of stock to be pressed into the groove.

By suitable change in the cross-sectional shape of the mandrel, there may be manufactured electrodes of correspondingly different cross-sectional shape. For example, as shown in Fig. 18, the tubular electrode may have wide, flat, parallel faces $a$, $a1$ and narrow, curved faces $c$, $c1$ with a seam of any suitable type, such as a lockseam or welded seam, extending longitudinally of any of the faces, for example one of the narrow faces.

Moreover, the electrode, whether or not of the shape shown in Fig. 18, may be provided with any suitable arrangement of beads, for example, beads b3—b6, two of which, b3, b5, extend across the seam.

When the tabs T are applied to the strip S, Fig. 19, or to the blanks B or B1, Fig. 23 after their detachment from the strip S and in advance of discharge from the mandrel or equivalent about which they are shaped, the region of tab attachment should be displaced from those edges or marginal areas of the blank which are to be shaped or operated upon to form the seam, particularly when the electrodes are formed by mechanism of the type shown in Figs. 1 to 16, in which attachment of tabs to the seam-forming areas of the unshaped blanks would cause interference between the tab projecting from one blank and an adjacent blank during shaping of the latter. Possibility of such interference is avoided by the disposition of welding contact 147 at fixed, relatively short distance from the blanking die 41 obtained by mounting contact 147 and die 41 upon their common movable support 33. It is thus ensured the tabs T with precision are always similarly and properly located on successive blanks notwithstanding the narrowness of the blanks and the tendency of strip S to buckle during feed thereof; such mounting of contact 147 and die 41 on their common support 33 further, inherently, assures freedom from such integrated variations of position of attachment of the tabs to strip S as otherwise would eventually cause sufficient displacement of the tabs with respect to the marginal areas of their electrode blanks as to interfere with the subsequent shaping of the detached tabbed blanks.

When there is employed the method illustrated in Fig. 22, the tabs T may be applied to any desired area of the electrode, either on the seam or displaced therefrom. In accordance with this method, the strip S is cut to form the individual blanks B2 which are in succession shaped about a mandrel or equivalent into tubular form and the marginal areas or edges of each blank joined in any suitable manner to form a tubular electrode to which, before its removal from the mandrel, is attached a tab T preferably cut from strip K after the leading end of the strip has been attached, as by welding, to the forward end of the electrode.

The method illustrated in Fig. 22 may be performed by suitable modification of the apparatus disclosed and claimed in aforesaid Haslauer Patent 2,116,971 and in Figs. 1 to 16 hereof. As shown in Figs. 20 and 21, there is provided in front of the forward end of die block 32 a sub-base 170 upon which are mounted the guides 171, 172 for the welding contact 147A and the knife 130A reciprocated, respectively, by cams 173, 174 on shaft 107. Upon sub-base 170 is also mounted the housing 175 within which slide 176 is reciprocated by cam 177. The welding contact 146A, movable with slide 176, enters the forward end of a shaped blank or finished electrode or mandrel 53 at its forward end and serves to support and position the electrode during welding of a tab thereto. The knife member 131A, movable with slide 176 or, if desired, attached to a stationary bracket on sub-base 170, coacts with knife 130A to cut a tab T from strip K either immediately after its leading end has been welded to an electrode on mandrel 53 or substantially concurrently with the welding.

The strip K is intermittently fed by the feeding dog 132R movable with arm 135A biased by spring 136A toward engagement with stop 137A from which it is rocked by cam 178 on shaft 107.

Either or both of contacts 146A, 147A must be insulated from the frame of the machine and connected to a suitable source of welding current, for example transformer W of suitable rating and characteristics. As in the previously discussed modification, the welding circuit preferably is not completed until after engagement of strip K and electrode B has been effected and preferably is interrupted before either of contacts 146A, 147B move out of engagement with the electrode after welding of the tab thereto. The control of the welding current may be effected by the interrupter 154, previously described, or by any other suitable known timing device.

The mechanism shown in Figs. 20 and 21 is so timed that after the electrode has been tabbed, the mandrel 53 and slide 176 move in opposite directions to allow the tabbed electrode to fall into a suitable collecting tray or chute. While the mandrel 53 is in its forward position for shaping of a blank and truing of a finished electrode, slide 176 inserts contact 146A into the foremost electrode on the mandrel, dog 132A feeds the strip K over that electrode, and then contact 147A welds strip K to that electrode and knife 130A cuts the tab so attached by severing strip K.

It is within the scope of my invention to apply several tabs to each electrode, for example two tabs as in Fig. 24. The two or more tabs may be applied at the same stage or the several tabs may be applied at different stages. For example, the tabs may be so applied to the strip S of electrode material that each of the blanks B cut therefrom has two tabs, instead of one as in Fig. 19, extending from an end thereof; two or more tabs may be applied to the blank after detachment from strip S and before completion of its shaping, including formation of its seam, so that several tabs, instead of one as in Fig. 23, extend from the blank B3; one tab may be applied to strip S as in Fig. 19 and another tab may be applied to the blank before completion of its shaping, as in Fig. 23, or after completion of its shaping but before discharge from the mandrel, as in Figs. 20 and 21. The last-mentioned method may be performed by incorporating in the machine disclosed in Figs. 1 to 16 the additional mechanism shown in Figs. 20 and 21; any other suitable mechanism may, of course, be utilized. Both tabs may be attached at regions displaced from the seam, Fig. 24, or at least one of them may be attached to the seam.

For brevity in the appended claims, it shall be understood the terms "electrode stock" or "electrode material" generically comprehend the strip S, the blanks cut therefrom, and the electrodes shaped from the blank at any stage of their completion unless the contrary appears from the context; it shall also be understood the term "shaping" comprehends any one or more of the steps of bending the blank, joinder of its edges or marginal areas to form a seam, pressing of the seam, and truing of the electrode unless the context enforces a more specific meaning; it shall also be understood the term "tab stock" or "tab material" comprehends the strip K or tabs cut therefrom.

What I claim is:

1. A machine for making tabbed tubular electrodes comprising means for feeding a strip of electrode stock to a blanking station, means for feeding a strip of tab stock, a tool support movable toward and from said strips, a blanking die carried by said support for cutting blanks from said strip of electrode stock, structure movable with said support to effect attachment of said strips to each other, and means movable with said support for severing said strip of tab stock substantially concurrently with its attachment to said strip of electrode stock.

2. Apparatus for making tabbed tubular electrodes of small diameter for thermionic tubes comprising means for feeding a strip of electrode stock to a blanking station, a tool support movable toward and from said strip, a blanking die carried by said support for cutting blanks from said strip of electrode stock, tab-attaching means connected with said support at fixed predetermined distance in advance of said station, and means for actuating said support concurrently to effect attachment by said tab-attaching means of a tab to said electrode stock at said predetermined distance from said blanking station and to effect detachment of a tabbed blank from said electrode stock by said blanking die.

3. Apparatus for making tabbed tubular electrodes of small diameter for thermionic tubes comprising means for feeding a strip of electrode stock to a blanking station, a tool support movable toward and from said strip, a blanking die carried by said support for cutting blanks from said strip of electrode stock, a contact for welding tabs to said electrode stock and mechanically connected with said movable support at fixed predetermined distance in advance of said station, means for actuating said support concurrently to bring said contact into position effecting attachment of tabs to said electrode stock each at said distance from said station and to effect detachment of a tabbed blank from said strip by said blanking die, a source of current, and circuit-controlling means in circuit with said contact and said source for controlling duration of flow of current between the contact, tab and electrode stock and actuated in timed relation to said support.

4. Apparatus for manufacturing from electrode stock tubular electrodes of small diameter for thermionic tubes comprising a blanking die for cutting electrode blanks from said stock, movable means on which said die is mounted, means for feeding said electrode stock to said die, means adjacent the path of feed of said electrode stock for attaching tabs thereto, movable means on which said tab-attaching means is mounted at predetermined selected distance in advance of said blanking die, means interconnecting said means upon which said blanking die and said tab-attaching means are respectively mounted, and means for actuating said last-mentioned means to sever a tabbed blank from the electrode stock and to attach a tab to the electrode stock.

5. Apparatus for manufacturing seamed tubular electrodes of small diameter for thermionic tubes, with at least one tab per electrode, comprising movable means for attaching tabs at selected short intervals along a strip of electrode stock, a movable tool support upon which said attaching means is mounted, strip-cutting means mounted upon said support at predetermined selected distance from said tab-attaching means and movable therewith to detach from said strip electrode blanks with their attached tabs displaced from their seam-forming edges.

6. Apparatus for manufacturing seamed tubular electrodes of small diameter for thermionic tubes, with at least one tab per electrode, comprising a contact movable to weld tabs at selected short intervals along a strip of electrode stock, a movable tool support for said contact, strip-cutting means mounted upon said support at predetermined selected distance from said contact for movement therewith to detach from said strip electrode blanks with their attached tabs displaced from the seam-forming edges, a source of current, and means actuated in timed relation to movement of said strip-cutting means and in circuit with said contact and said source of current to time the flow of current between the contact, tab and electrode stock.

7. Apparatus for manufacturing seamed tubular electrodes of small diameter for thermionic tubes, with at least one tab per electrode, comprising movable means for attaching tabs at selected short intervals along a strip of electrode stock, a movable tool support for said tab-attaching means, strip-cutting means mounted upon said support for movement with said tab-attaching means at predetermined selected distance therefrom to detach from said strip electrode blanks with their attached tabs displaced from their seam-forming edges, and means for shaping the detached tabbed blanks into tubes comprising a mandrel for receiving blanks from said strip-cutting means and about which they are disposed with the tab of one blank overlying an adjacent blank at a region displaced from the seam-forming edges of said last-named blank, and tools adjacent the mandrel for shaping and seaming each blank in turn without interference by the overlying tab on said adjacent blank.

RICHARD H. GABEL.